(12) United States Patent
Park

(10) Patent No.: US 11,157,892 B2
(45) Date of Patent: Oct. 26, 2021

(54) MOBILE PAYMENT METHOD AND DEVICE THEREOF

(71) Applicant: HAREX INFOTECH INC., Seoul (KR)

(72) Inventor: Kyung Yang Park, Seoul (KR)

(73) Assignee: HAREX INFOTECH INC., Seoul (KR)

(*) Notice: Subject to any disclaimer, the term of this patent is extended or adjusted under 35 U.S.C. 154(b) by 132 days.

(21) Appl. No.: 16/306,376

(22) PCT Filed: May 31, 2017

(86) PCT No.: PCT/KR2017/005691
§ 371 (c)(1),
(2) Date: Nov. 30, 2018

(87) PCT Pub. No.: WO2017/209513
PCT Pub. Date: Dec. 7, 2017

(65) Prior Publication Data
US 2020/0327532 A1     Oct. 15, 2020

(30) Foreign Application Priority Data
May 31, 2016 (KR) .................... 10-2016-0067774

(51) Int. Cl.
*G06Q 20/32* (2012.01)
*G06Q 20/10* (2012.01)
(Continued)

(52) U.S. Cl.
CPC ....... *G06Q 20/3267* (2020.05); *G06Q 20/108* (2013.01); *G06Q 20/204* (2013.01);
(Continued)

(58) Field of Classification Search
CPC ...... G06Q 20/10; G06Q 20/204; G06Q 20/20; G06Q 10/08; G06Q 20/38; G06Q 20/32;
(Continued)

(56) References Cited

U.S. PATENT DOCUMENTS 8,016,192 B2 * 9/2011 Messerges .............. G06Q 20/32
235/380
8,041,633 B2 * 10/2011 Knowles ................ G06Q 30/06
705/39
(Continued)

FOREIGN PATENT DOCUMENTS

GB        2530345 A * 3/2016   ............ G06Q 20/22
KR   10-1339661 B1    12/2013
(Continued)

OTHER PUBLICATIONS

International Search Report for PCT/KR2017/005691 dated Aug. 31, 2017 [PCT/ISA/210].
(Continued)

*Primary Examiner* — Andrew Joseph Rudy
(74) *Attorney, Agent, or Firm* — Sughrue Mion, PLLC

(57) ABSTRACT

A mobile payment is provided. A mobile payment method includes the steps of: receiving a payment request from a merchant terminal; determining whether a merchant, which has transmitted the payment request, has an affiliated application; determining, by means of preset priorities, an application having a top priority among a plurality of payment applications according to the determination result; and transmitting, to a user's mobile terminal, a push command for executing the application determined to have the top priority.

8 Claims, 7 Drawing Sheets

(51) Int. Cl.
*G06Q 20/20* (2012.01)
*G06Q 20/40* (2012.01)
*H04L 29/08* (2006.01)
*G06F 9/48* (2006.01)
*G06Q 30/02* (2012.01)

(52) U.S. Cl.
CPC ....... *G06Q 20/3223* (2013.01); *G06Q 20/405* (2013.01); *G06Q 20/4014* (2013.01); *H04L 67/26* (2013.01); *H04L 67/322* (2013.01); *G06F 9/4881* (2013.01); *G06Q 30/0226* (2013.01); *G06Q 30/0238* (2013.01)

(58) Field of Classification Search
CPC ............ G06Q 20/405; G06Q 20/3267; G06Q 20/4014; G06Q 30/0226; G06Q 30/0238; G06Q 10/04; G06Q 20/108; G06Q 20/3223; G06Q 20/40; H04L 29/08; H04L 67/322; H04L 67/26; H04W 88/02
See application file for complete search history.

(56) References Cited

U.S. PATENT DOCUMENTS

| | | | | |
|---|---|---|---|---|
| 9,803,639 B2* | 10/2017 | Hauser | ............... | F04C 15/0038 |
| 9,830,639 B2 | 11/2017 | Kim | | |
| 10,169,744 B2* | 1/2019 | Akashika | ............ | G06Q 20/407 |
| 10,467,689 B2* | 11/2019 | Chen | ................... | G06Q 20/227 |
| 10,552,813 B2* | 2/2020 | Deutscher | ............ | G06Q 20/127 |
| 10,558,963 B2* | 2/2020 | Desai | ................... | G06Q 20/204 |
| 10,719,822 B2* | 7/2020 | Vyas | ................ | G06Q 20/40145 |
| 10,891,647 B2* | 1/2021 | Gantert | ............. | G06Q 20/3224 |
| 10,949,822 B2* | 3/2021 | Anderson | ........... | G06Q 20/027 |
| 2012/0284188 A1* | 11/2012 | Vasquez | .................. | G07F 19/20 |
| | | | | 705/44 |
| 2013/0018758 A1 | 1/2013 | Balasubramanian et al. | | |
| 2015/0088736 A1 | 3/2015 | Bu et al. | | |
| 2015/0161713 A1 | 6/2015 | Kim | | |
| 2015/0178708 A1* | 6/2015 | Reutov | ................ | G06Q 20/027 |
| | | | | 705/44 |
| 2016/0232558 A1* | 8/2016 | Postrel | .................... | G06Q 20/12 |
| 2017/0243262 A1* | 8/2017 | Pan | ........................ | G07B 15/06 |
| 2020/0273027 A1* | 8/2020 | Gordon | ................ | G06Q 20/023 |

FOREIGN PATENT DOCUMENTS

| | | |
|---|---|---|
| KR | 10-2015-0021833 A | 3/2015 |
| KR | 10-2015-0022259 A | 3/2015 |
| KR | 10-2015-0033209 A | 4/2015 |
| KR | 10-2015-0059205 A | 6/2015 |
| WO | 2009055704 A2 | 4/2009 |
| WO | 2012119052 A1 | 9/2012 |

OTHER PUBLICATIONS

Written Opinion for PCT/KR2017/005691 dated Aug. 31, 2017 [PCT/ISA/237].
Communication dated Jan. 2, 2020, from the European Patent Office in application No. 17807006.6.

* cited by examiner

MOBILE PAYMENT METHOD AND DEVICE THEREOF

CROSS-REFERENCE TO RELATED APPLICATION

This application is a National Stage of International Application No. PCT/KR2017/005691 filed May 31, 2017, claiming benefit from Korean Patent Application No. 10-2016-0067774 filed May 31, 2016.

TECHNICAL FIELD

The present invention relates to mobile payment, and more specifically, to a payment method in a server in which mobile payment is performed and a device for executing mobile payment.

BACKGROUND ART

Recently, as payment methods using mobile terminals, such as smart phones, have been increasing, various payment methods have been introduced.

When a payment is made through a payment application based on a mobile operating system (OS), various payment gateway companies provide a payment platform to offer a payment service.

Thus, when a payment is made by executing an application installed in a mobile terminal for online or offline payment, it is not known which of a plurality of applications, which provide a payment application, is to be executed, which may cause an inconvenience of designating an application for use in payment each time a user makes a payment.

In addition, when the user makes a payment using various payment applications, each application manages transaction related payment information, and hence such pieces of information are not integrally managed and used.

DISCLOSURE

Technical Problem

The present invention is devised in view of the above-described technical background, and one objective of the present invention is to provide a mobile payment method and a mobile payment system which includes a server that, when a plurality of mobile payment applications are present in a user's mobile terminal, automatically determines and provides the top priority payment application without intervention of a user by defining an execution order of the payment applications and, when a payment application is executed using a push scheme, integrally manages all information regardless of a type of payment application by executing the top priority payment application.

Another objective of the present invention is to provide an open marketing platform in which a payment service operator integrally manages transaction related payment information and accordingly, when a user makes a payment at another merchant using an application of an affiliate, provides transaction information of another merchant to the affiliate, thereby allowing the transaction information to be utilized in marketing.

The present invention is not limited thereto, and other objectives not described above will be more clearly understood from what has been set forth hereunder.

Technical Solution

One aspect of the present invention provides a mobile payment method including: receiving a payment request from a merchant terminal; determining whether the merchant, which has transmitted the payment request, has an affiliated application; determining, by means of preset priorities, an application having a top priority among a plurality of payment applications; and transmitting, to a mobile terminal of a user, a push command for executing the application determined to have the top priority.

In the case in which the merchant has the affiliated application, the determining of a priority includes, when the merchant has the affiliated application and the affiliated application of the merchant including a payment module is installed in the mobile terminal, determining that the affiliated application of the merchant has the top priority; when there is no affiliated application of the merchant but there is a payment application determined by the user as a primary payment application, determining that the primary payment application has the top priority; when the primary payment application does not exist and a basic payment application including a payment means independent of the affiliated application is present, determining that the basis payment application has the top priority; and when the basic payment application does not exist and an affiliated application of a merchant is different from the aforementioned merchant, determining that an affiliated application including the last-installed payment means among affiliated applications of the different merchant has the top priority.

In the case in which the merchant does not have the affiliated application, the determining of a priority includes, when a payment application determined by the user as a primary payment application is present in the mobile terminal, determining that the primary payment application has the top priority; when the primary payment application does not exist and a basic payment application including a payment means independent of the affiliated application is present, determining that the basis payment application has the top priority; and when the basic payment application does not exist and an affiliated application of a merchant is different from the aforementioned merchant, determining that an affiliated application including the last-installed payment means among affiliated applications of the different merchant has the top priority.

Another aspect of the present invention provides a mobile payment system including a mobile terminal in which at least two or more applications for payment including a payment module provided by a service operator are installed and which, when a push command for executing an application is received from the service server, executes the application and requests payment approval by transmitting transaction information and authentication information to the service server; a service server configured to, when a payment request is received from a merchant terminal, determine, by means of preset priorities, an application having the top priority among a plurality of applications installed in the mobile terminal, transmit, to the mobile terminal, a push command for executing the application having the top priority, perform user verification and authentication of the application for payment using the authentication information when a payment approval request is received from the mobile terminal, store the transaction information, and transmit the transaction information and the authentication information to a financial server; and the financial server configured to execute payment by receiving the transaction information and the authentication information and transmit a payment result to the service server or the mobile terminal.

Advantageous Effects

According to the present invention, when various payment applications are present, a payment application execution service is provided according to a preset execution priority of each payment application so that the top priority payment application is determined and provided without intervention of a user, thereby providing convenience to the user. In addition, transaction information is collectively stored in a service server so that user related information can be effectively used, and information, such as subscriber authentication or financial institution registration, is shared so that user convenience can be improved.

MODES OF THE INVENTION

Figure 1:
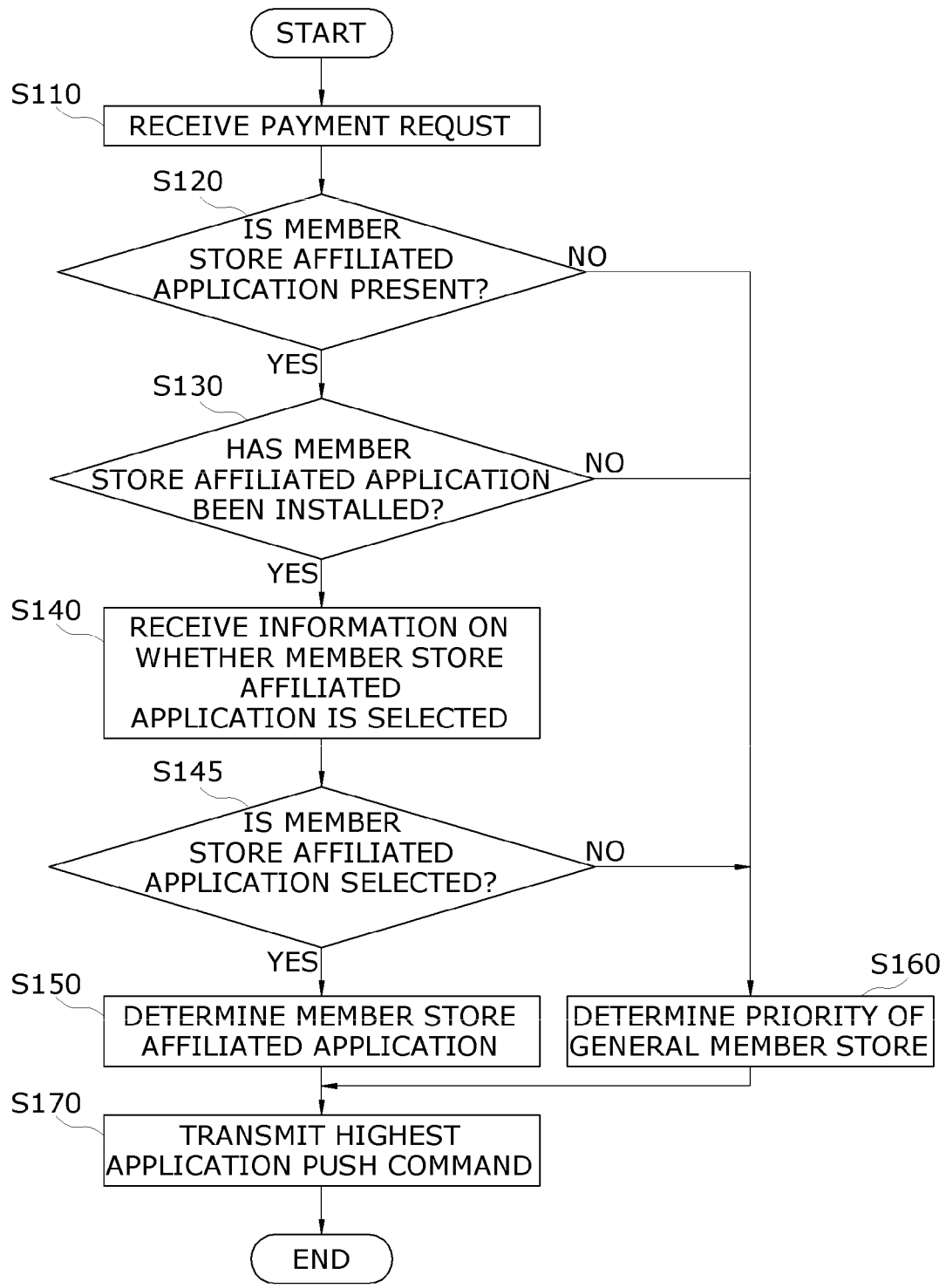
FIG. 1 is a flowchart illustrating a mobile payment method according to one embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. The terminology used in the detailed description is provided only to describe the embodiments of the present invention and not for purposes of limitation. Unless the context clearly indicates otherwise, the singular forms include the plural forms. It should be understood that the terms "comprises" or "comprising" specify some features, numbers, steps, operations, elements, and/or combinations thereof when used herein, but do not preclude the presence or possibility of one or more other features, numbers, steps, operations, elements, and/or combinations thereof in addition to the description.

Hereinafter, exemplary embodiments of the present invention will be described in detail with reference to the accompanying drawings.

There has been an increase in the number of cases in which payment is made using a mobile terminal for both online and offline, and a plurality of various payment applications are frequently installed in a single mobile terminal. In this case, when execution priorities of the applications are not determined, it may cause an inconvenience of designating an application to be used for payment each time the user makes a payment.

In order to reduce the inconvenience of the user, the present invention provides a method of assigning priorities to a plurality of applications, thereby allowing a payment application to be automatically executed according to the priority.

A basic operating environment and a payment method of the present invention will be summarized and then the configuration of the present invention will be described in detail with reference to the embodiments.

The present invention provides a user-oriented payment system. When a user transmits card information or the like to a store and the store requests for a payment approval from a financial company as in a conventional case, there is a high risk that financial information is exposed, which may cause a security problem, and it takes time to use saved points.

Therefore, the present invention provides a method in which a store transmits transaction details to a user, and the user issues a payment request after confirming the transaction details or the store issues a payment request including the transaction details.

In addition, a structure is provided in which a payment service operator (hereinafter shortly referred to as an "operator") which is placed between the user, the store, and a financial institution issues a payment request including transaction details and excluding the user's financial information, and a service server requests a payment approval to the financial company (a financial card company, a bank, etc.). In this case, it is a prerequisite that the user has subscribed as a member of the service server, and thus the service server manages user's basic information so that the payment request is processed by including non-financial information, such as an transaction ID (TID), a mobile terminal identifier (phone number and the like), a user identifier (membership number) and the like, in the transaction details (an amount of transaction, a transaction item, store information, etc.) and a payment request message without transfer of financial information, such as credit card number and the like, between the mobile terminal and the service server.

An approval request is processed using the transaction ID, the mobile terminal identifier, or the user identifier, without transfer of the financial information between the service server and the financial company.

In this case, since the financial information is not stored in any of a store terminal, the user mobile terminal, and the service server, even when the store terminal, the user mobile terminal, or the service server is hacked, there is no possibility for the user's financial information to be stolen, and thus the security is significantly improved.

In addition, since data transfer between the service server and the financial company is performed via a cable network with enhanced security, the service server may be configured to store the financial information of the user (member) and issue an approval request for each transaction by transferring the financial information to the financial company.

In the operating environment of the present invention, since the service server is interposed between the user, the store, and the financial company and the transaction information is transmitted to the service server when a payment request is made, the service server may collect detailed information (item, unit price, quantity, etc.) of each transaction for each user when a user consents to acquisition of transaction information and may build big data about the user's lifestyle.

Accordingly, affiliates that are affiliated with the operator via the service server, that is, various service providers (e.g., a financial company for performing payment, a manufacturer, a sales company, a charity organization, a game company, an entertainment company, a broadcasting company, a social network operator, an education-related organization, and the like) affiliated with the operator may be provided with information related to user's purchase activities and information related to donation activities from the service server.

Here, a key feature is that, for example, a detail of purchase made from service provider A can be provided to service provider B by the operator.

In this case, the service provider A may or may not be affiliated with the operator while the service provider B is affiliated with the operator.

Accordingly, various service providers affiliated with the operator are allowed to access much more accumulated big data than transaction details made with the service providers and perform marketing using the big data. As a result, it is possible to implement an open marketing platform and an open payment platform.

Meanwhile, as more service providers (hereinafter shortly referred to as "affiliates") are affiliated with the operator, collection of data related to a user's purchase and donation activities can be more actively performed and more affiliates can access big data. Thus, the present invention provides an app-in-app payment solution for affiliates that do not have their own payment applications.

That is, in the case of an affiliate that has its own application which does not have a payment feature, the operator provides a payment module to allow a payment feature to be available in the application of the affiliate.

The payment module of the operator may be installed in the user's mobile terminal in the form of an update of the affiliate's own application and be linked with the affiliate's application. When the payment module of the operator is installed, it is preferable that a phrase, for example, "powered by Usage Based Insurance (UBI) pay," for indicating that the payment module of the operator is installed is displayed in the affiliate's own application.

When the user attempts to make a payment using the affiliate's application, the user is allowed to use all of one or more financial companies affiliated with the operator.

In order for the service provider to establish a payment solution, such as its own payment application, and perform a payment process, the service provider has to be affiliated with one or more financial card companies and banks, and for the sake of user convenience, it is necessary to be affiliated with as many financial card companies and banks as possible. However, unless the service provider is of significant scale, the service provider cannot build a payment solution. According to the present invention, when the service operator, which is affiliated with a plurality of financial companies, provides the operator payment module to the affiliate in an app-in-app manner and the payment module is installed in or associated with the affiliate's own application, the affiliate, even a small scaled service provider, may easily provide a payment feature enabling payment in its own application through various financial companies affiliated with the service operator.

In addition, when the user makes a payment to another service provider or makes a payment for the purchase made at a store of another service provider through the application of the affiliate, the affiliate may be provided with the corresponding transaction information.

Accordingly, the affiliate is allowed to access the transaction information of other service providers as well as transaction information of itself, and hence can utilize much more user purchase information or activity information (hereinafter abbreviated to "purchase information"), such as donation activities. In addition, since the purchase information includes not only a purchase amount, but also detailed information, such as a purchased item, the affiliate is able to conduct accurate marketing using such information.

That is, through the present invention, it is possible to perform open payment and open marketing by sharing financial companies and user purchase information, unlike in a conventional closed system.

One specified embodiment of payment and acquisition of purchase information through the affiliate's application is described below.

It is assumed that Homeplus, which is a Korean discount store retail chain, is affiliated with an operator and has an operator payment module installed in or associated with their own application.

A user who has installed a Homeplus application in his/her mobile terminal as a Homeplus member becomes a member of the operator and agrees to use of purchase information in the course of installation of an operator payment module in the user's mobile terminal in the form of a Homeplus application update or the like.

Then, when the user purchases, for example, a mobile viewing coupon for Music Network (Mnet) and makes a payment using the Homeplus application (when there are a number of payment means in the Homeplus application and the payment is made using the operator payment module by selecting the operator payment means of the present invention), a payment is made through the service server so that the service server can learn the purchase details of the mobile viewing coupon of the user. In addition, the operator provides the purchase details of the mobile viewing coupon of the user to Homeplus, which is an affiliate, so that Homeplus can also learn the purchase details of the mobile viewing coupon of the user.

That is, Homeplus is able to learn not only details of purchases made by the user at Homeplus stores but also the details of purchases made from other service providers.

When the user purchases the mobile viewing coupon for Mnet, the user may use a payment means provided by Mnet, but when Homeplus offers more rewards (points to be saved), the user may makes a payment through the Homeplus application for the Mnet products.

Therefore, each affiliate tries to encourage the user to make a payment through its own application in order to be provided with more user purchase information. To this end, each affiliate may offer more rewards, such as points to be saved, and the user may have a wider range of selection and conduct purchasing activities while receiving more benefits.

Meanwhile, since there are already many payment methods and various payment means are being provided by service providers, a plurality of payment means are often included in a single mobile terminal.

In this case, since it is troublesome for the user to select one from the plurality of payment means every time, it is preferable that a priority for each payment means is set automatically.

Hereinafter, an embodiment in which a priority is determined for each payment means will be described.

In the present specification, the payment means may be classified into the following types.

A payment application includes a basic payment application designed and managed by a payment service operator and a service provider application with a payment feature which is managed by a service provider, such as Homeplus, eBay, and the like.

The basic payment application is an application designed by a service provider to provide a payment service regardless of affiliation, and when the basic payment application is selected at the time of payment, the basic payment application is executed to perform payment.

In the present specification, an affiliated application is autonomously designed and managed by a service provider and includes an independent application for the case where the service provider is affiliated with an operator, an independent affiliated application that has been newly designed for the affiliate by the operator on the basis of a platform of the basic payment application by reflecting brand, design and specialized functions of the affiliate, and a module-type affiliated application created by embedding a payment module provided by the operator into an existing application of the affiliate.

The independent affiliated application is registered in an application download server, such as App Store, Google Play, and the like, and can be downloaded from such servers, and a brand or design of an affiliated store may be applied thereto on the basis of a platform provided by the service operator.

The module-type affiliated application is registered in an application download server but does not need to be downloaded separately, and it is automatically downloaded and installed through a process, such as obtaining user's consent to downloading, while the user is updating the affiliated application or executing payment. Since the module-type affiliated application is not in the form that is independently executed, a separate execution icon or the like is not present in the user's mobile terminal such as a smartphone.

When the service operator that manages the service server may develop and supply an application or module capable of providing a payment service to an affiliated partner, it is desirable to design and develop the application such that the application is applicable to any operating system (OS) and can improve the user convenience by sharing commonly used functions, such as subscriber authentication, financial institution registration, and the like.

In summary, in the present specification, the payment application collectively refers to a self-same application, a basic payment application, an affiliated application (including a self-same application, an independent application, and a module-type application), and a payment application designated by the user is referred to as a primary payment application.

FIG. 1 is a flowchart illustrating a mobile payment method performed in a service server according to one embodiment of the present invention.

In online/offline payment, the service server receives a payment request from a merchant for settlement (S110). The service server may also be configured to receive a payment request from a mobile terminal of a user that has received transaction information from the merchant.

Meanwhile, the merchant collectively refers to a store, an institution, or the like in which a payment means of a payment service operator can be used, and the store refers to a place where a sales service is provided. However, in the present invention, the store also means a place where the payment means of the operator is usable, and thus, the term "store" used in the present specification has substantially the same meaning as the merchant, and the merchant and the store are described differently in each embodiment merely for convenience of description.

The service server which has received the payment request transmits the payment request for requesting a user's approval to the user mobile terminal in the form of a push command. At this time, since a plurality of payment applications may be installed in the user mobile terminal, the service server determines which application is to be used for payment among the plurality of applications installed in the user mobile terminal and then transmits a push command.

An embodiment in which the service server determines a payment application of the user is described below.

The service server determines whether the merchant which transmits the payment request has an affiliated application (S120).

To this end, the payment request for settlement may include a merchant ID and whether the merchant has the affiliated application may be determined using the merchant ID.

When it is determined that the payment request is received from the merchant having the affiliated application, whether the affiliated application has been installed in the user's mobile terminal is further determined (S130), and when the merchant affiliated application has been installed in the mobile terminal, the affiliated application is determined to be an application of the top priority (S150), and a push command for executing the application determined to have the top priority is transmitted to the user's mobile terminal (S170).

In order to determine whether the affiliated application is installed in the user's mobile terminal, the service server stores application installation history of each user in a database (DB) and identifies and manages which payment application is installed in a user's mobile terminal by each user.

When the affiliated application exists, since the affiliated application contains coupon information, discount benefits, point saving information, or the like which can be used in the corresponding merchant, it is most beneficial for the user to use the merchant-affiliated application for payment. Thus, the top priority is assigned to the merchant-affiliated application.

Even when the merchant-affiliated application is installed, a method of setting a different priority at the user's choice without assigning the top priority to the merchant-affiliated application may be possible. For example, when both the affiliated application and a basic payment application have been installed in the user's mobile terminal, the merchant-affiliated application and the basic payment application are all displayed, the user selects one of the applications and receives a selection result (S140), and then whether the merchant-affiliated application has been selected is determined (S145). When the merchant-affiliated application is selected, the top priority is assigned to the merchant-affiliated application (S150), and otherwise, a payment application is determined according to an execution priority of an application for the merchant which does not have the merchant-affiliated application, which will be described below (S160).

When a payment request is received from a merchant which does not have the store-affiliated application or when an application affiliated with the corresponding merchant is not installed in the user's mobile terminal, execution priorities of applications for a general merchant are determined (S160) and a push command for executing the application determined to have the top priority is transmitted (S170).

The service server may store and manage installation history of a payment application installed in the user's mobile terminal and may store and manage a list of applications installed in the user's mobile terminal since user verification and payment application authentication are carried out by the service server. Therefore, the service server may determine execution priorities of applications installed in the user's mobile terminal and transmit the push command according to the determination.

Figure 2:
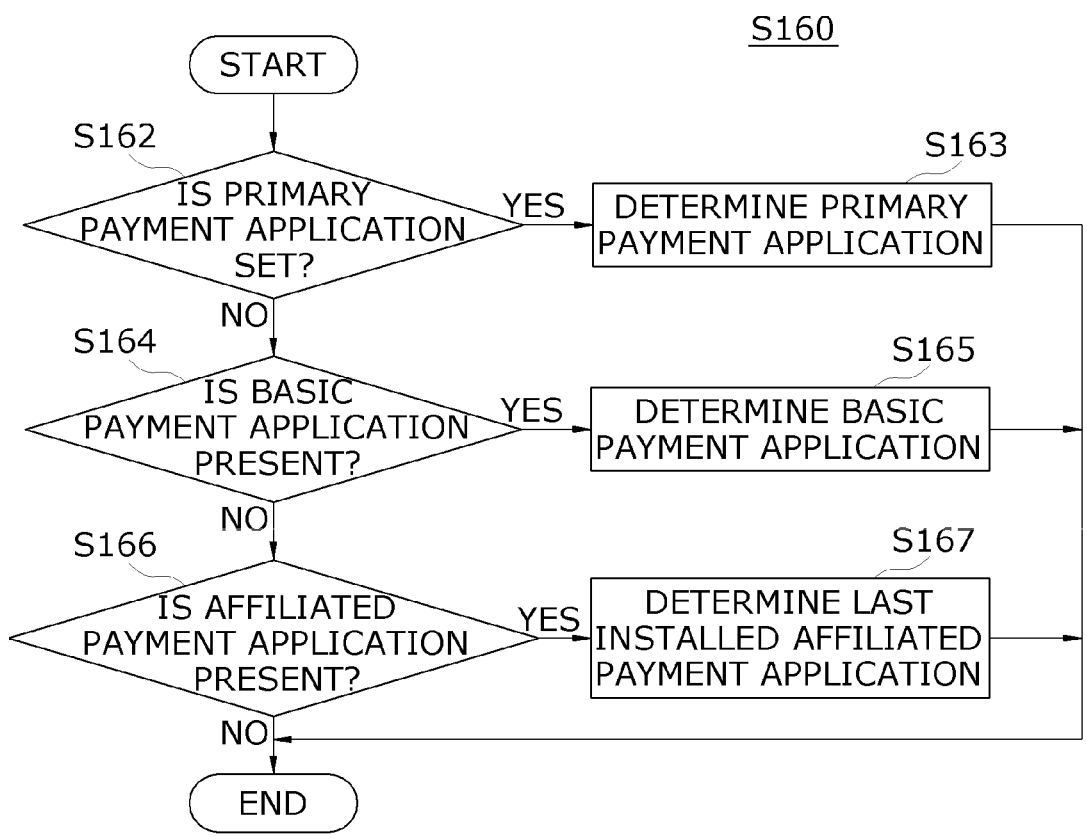
FIG. 2 is a flowchart illustrating a method in which a service server determines priorities of payment applications through which a push command will be transmitted when a mobile terminal does not have a merchant-affiliated application, in a mobile payment method according to another embodiment of the present invention.

FIG. 2 is a flowchart illustrating a method S160 in which the service server which has received a payment request determines priorities of applications through which a payment request push command will be transmitted when a merchant-affiliated application is not present.

When the merchant-affiliated application is not installed, whether there is an application set by a user as a primary payment application among installed payment applications is determined (S162), and when the primary payment application set by the user is present, the primary payment application is determined to be an application to be used for payment (S163).

When the user has already set a frequently used payment application as the primary payment application, it is advantageous to use the corresponding application in that convenience can be provided to the user and benefits can be concentrated, and inconvenience of being unable to make a payment due to absence of a merchant-affiliated application may be avoided.

When there is no application set by the user as the primary payment application, whether a basic payment application of the operator which can make a payment independently, regardless of an affiliated application, is determined (S164), and when the basic payment application is installed, the basic payment application is determined to be an application to be used for payment (S165).

Lastly, even when the basic payment application is not installed, whether an affiliated payment application of another merchant is present is determined (S166), and when one or more affiliated payment applications are present, the most recently installed payment application is determined to be an application to be used for payment (S167).

In another embodiment, in a case in which the user designates an affiliated application of a specific affiliate as the primary payment application, since such an event is notified to the service server and thus the service server recognizes the designation, the service server may be configured to select the designated primary payment application rather than selecting the application of another affiliate even when a merchant at which the transaction is made is a member of another affiliate.

When the determination of priorities for the affiliated merchants or priorities for the general merchants are completed and the push command for executing the payment application is transmitted to the user's mobile terminal, the user's mobile terminal which has received the push command executes the corresponding application and performs payment.

In a case in which the payment request is received from the affiliated merchant, payment may be executed by automatically applying a membership point or a discount coupon at the time of running the application. In this case, the user does not need to search for a point card or a discount coupon and is able to make a payment for a price to which the benefit of the corresponding merchant is applied, thereby minimizing the user's inconvenience. In addition, when there are various benefits, a price to which a benefit of a higher discount rate or more points to be saved is first applied may be provided to the user.

When no application for payment is installed in the user's mobile terminal, the service server may transmit a push command for installing a payment application or provide an installation link, thereby allowing the user to install an application for payment.

Figure 3:
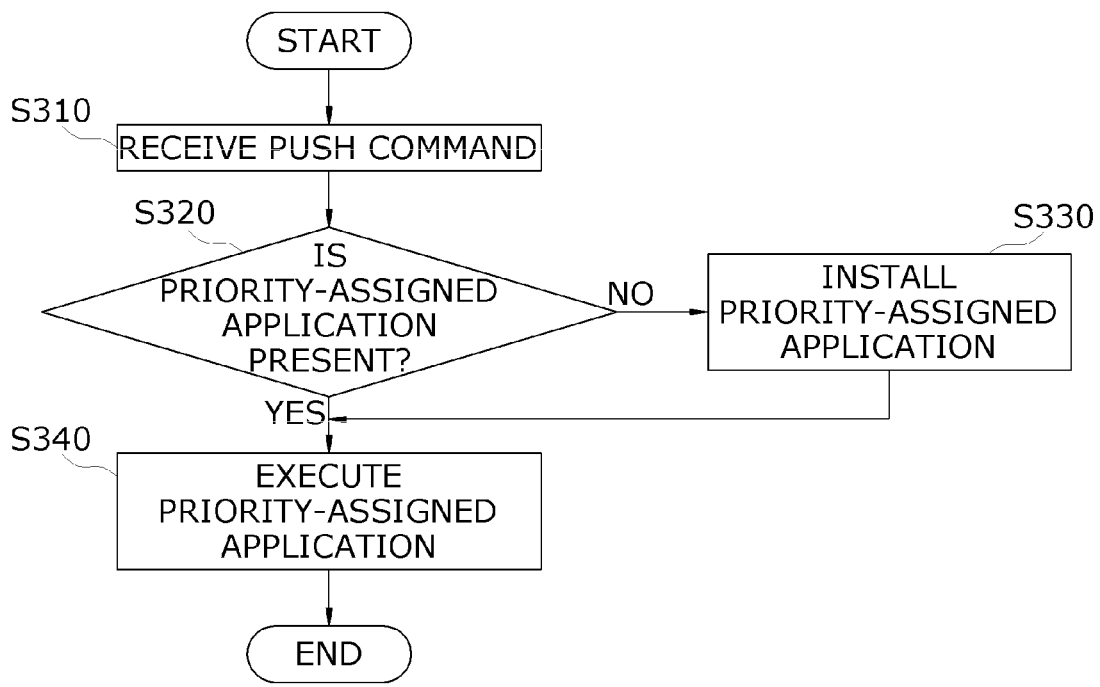
FIG. 3 is a flowchart illustrating a method of installing and executing a payment application when a mobile terminal does not have a payment application in a mobile payment method according to still another embodiment of the present invention.

FIG. 3 is a flowchart illustrating a method of installing an application for payment when there is no payment application.

When a user's mobile terminal receives a push command for requesting user's approval (S310), the mobile terminal determines whether the payment application determined in the above-described process and included in the push command is present in the mobile terminal (S320).

When it is determined that the payment application determined by the service server is present, the payment application is immediately executed (S340), and when the application is not installed due to deletion or the like, the corresponding payment application is installed (S330) and then executed (S340).

As described above, by determining priorities of the applications to be executed for online and offline payments, an optimal application is automatically selected and executes payment according to a situation without requiring the user to select an application to be used for payment every time, and even when an affiliated application of a merchant that transmits a payment request is not installed in the user's mobile terminal, it is possible to process payment through an application of another merchant or a basic application so that the merchant can have an effect of increasing sales and the user can easily settle payment without the inconvenience of not being able to make a payment due to absence of the affiliated application of the corresponding merchant.

Figure 4:
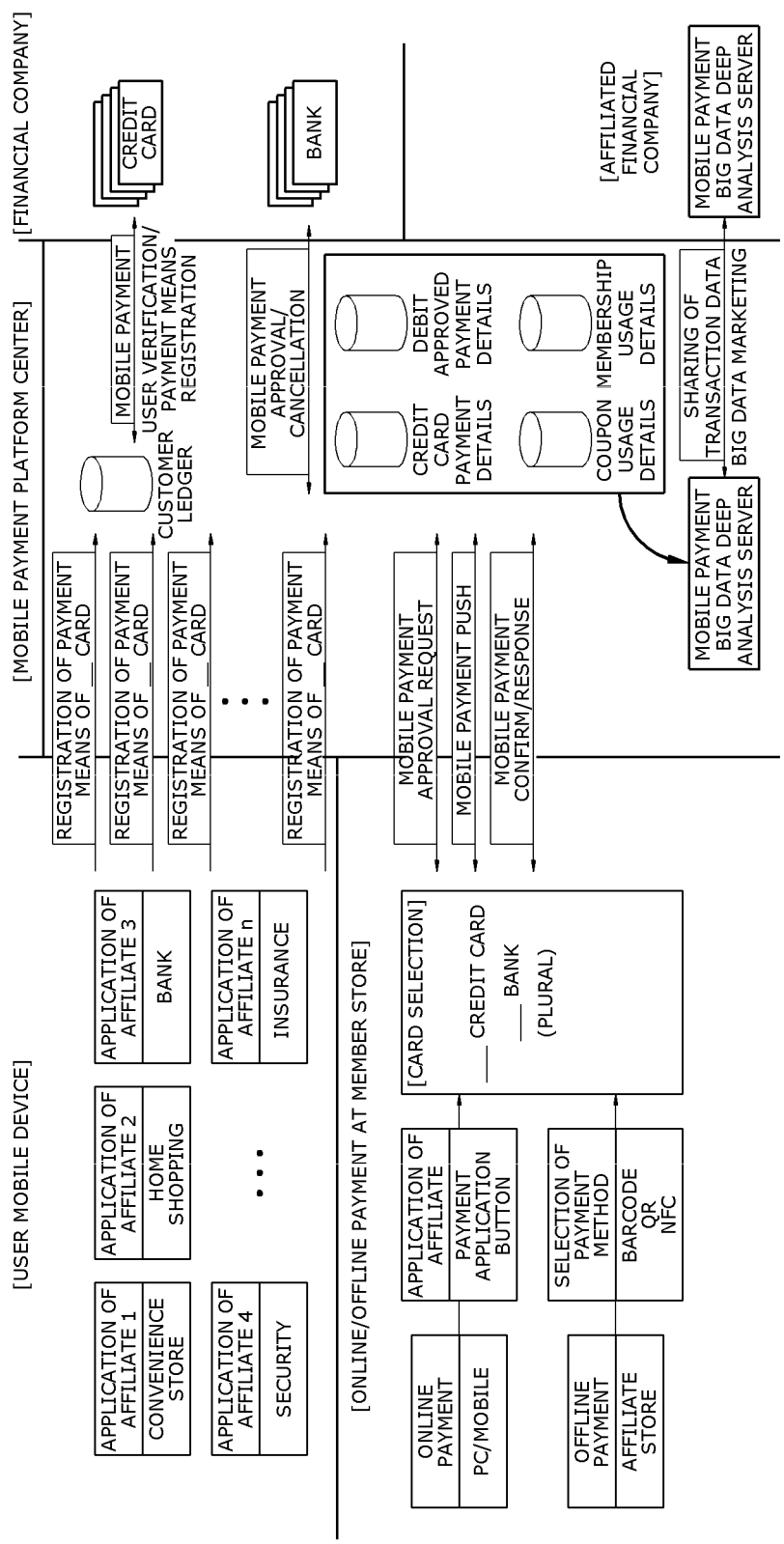
FIG. 4 is a structure diagram of an entire system in which a mobile payment is made according to the present invention.

FIG. 4 is a structure diagram of an entire system in which a mobile payment is made according to the present invention.

Various affiliated applications of convenience stores, home shopping companies, banks, security companies, insurance companies, and the like are installed in a user's mobile terminal, and information and a payment means of each of the affiliated applications is registered and managed by a mobile payment platform center, that is, a service server of a service operator.

When online/offline payment is made using various applications installed in the user's mobile terminal, the service server determines a payment application to be executed from the plurality of applications according to preset priority logic and transmits a push command for executing the application for user's approval to the user's mobile terminal, and the user requests or approves the payment using the mobile terminal, thereby executing the payment.

The subsequent payment process performed by the user using the payment application installed in the user's mobile terminal may be performed according to a conventional method, and hence a detailed description thereof will not be provided in the present specification.

In the foregoing description, the process flow is described, mainly focusing on the processes of issuing, by the merchant terminal, a payment request to the service server and determining, by the service server which has received the payment request, an application to be executed among applications installed in the user terminal and transmitting a payment application execution command to request a user's approval in a push manner.

In another embodiment, the merchant terminal may issue a payment request to the user's mobile terminal, and the user may select one of payment applications installed in the user's mobile terminal and execute payment. The selection logic of a payment application may allow the primary payment application designated by the user to be executed all the time, or may check whether the merchant belongs to the affiliate on the basis of a merchant ID included in the payment request and allow a corresponding affiliated application to be executed.

The primary payment application may be any one of the basic payment application, the affiliated application, and a self-same application of a particular service provider.

Since the plurality of applications installed in the user's mobile terminal use a common payment module provided by the service operator, payment information is exchanged via the service server, regardless of an affiliated company, and payment details, approval details, and usage details of membership, coupons, or the like are all stored in the service server.

For example, in a case where a user makes a payment at merchant A by using an affiliated application of merchant B, conventionally, only merchant A retains purchase information and thus the integration of purchase information cannot be realized and thus utilization of such information is limited. However, according to the present invention, the purchase information of merchant A may be transmitted to the affiliated application of merchant B by the service server, and accordingly, all the payment information may be integrally managed in the user's mobile terminal, regardless of a payment application used, and similarly, purchase information of all users may be accumulated in the service server, irrespective of the merchant and the type of affiliated application so that the purchase information can be used in a big data analysis method.

Figure 5:
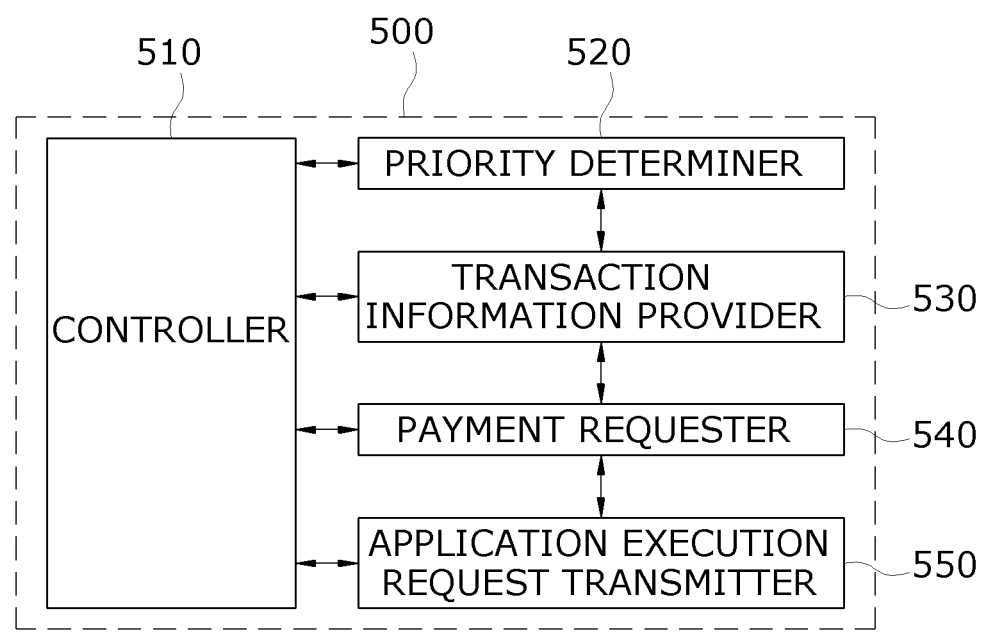
FIG. 5 is a structure diagram of a mobile payment server according to another embodiment of the present invention.

The service operator may utilize mobile payment information stored in the service server thereof using a big data analysis scheme and may advantageously utilize transaction data in marketing by sharing with affiliated financial companies for information sharing as well as with financial companies subscribed to the service. The method by which the service server provides the transaction information of the users to the merchants may include various methods, such as provision of the information only to the merchants managing an affiliated application used for payment and further provision of the transaction information to other arbitrary merchants that have requested the information. FIG. 5 is a structure diagram of a service server 500 which provides a mobile payment service according to another embodiment of the present invention.

The service server 500 includes a controller 510, a priority determiner 520, a transaction information provider 530, a payment requester 540, and an application execution request transmitter 550.

The controller 510 manages each module to transmit and receive data necessary for payment.

The priority determiner 520 determines a priority of an affiliated application or basic payment application to be used for payment according to predefined payment application priority logic.

The application execution request transmitter 550 transmits a push command for requesting a user's approval and executing an application determined to have the top priority to a mobile terminal of the user according to the determined priority and allows the mobile terminal to execute the corresponding application and perform payment.

When the mobile terminal executes the payment application and sends a payment approval request to the service server 500, the payment requester 540 transmits the payment approval request to a financial server, thereby allowing the payment to be approved.

The transaction information provider 530 provides an affiliated application installed in the user's mobile terminal with payment information, such as purchase information, received from the merchant terminal or the user's mobile terminal so that the user can integrally manage the payment information. In addition, the transaction information provider 530 provides the transaction information to an affiliate so that the affiliate that has received the transaction information can utilize the transaction information.

Figure 6:
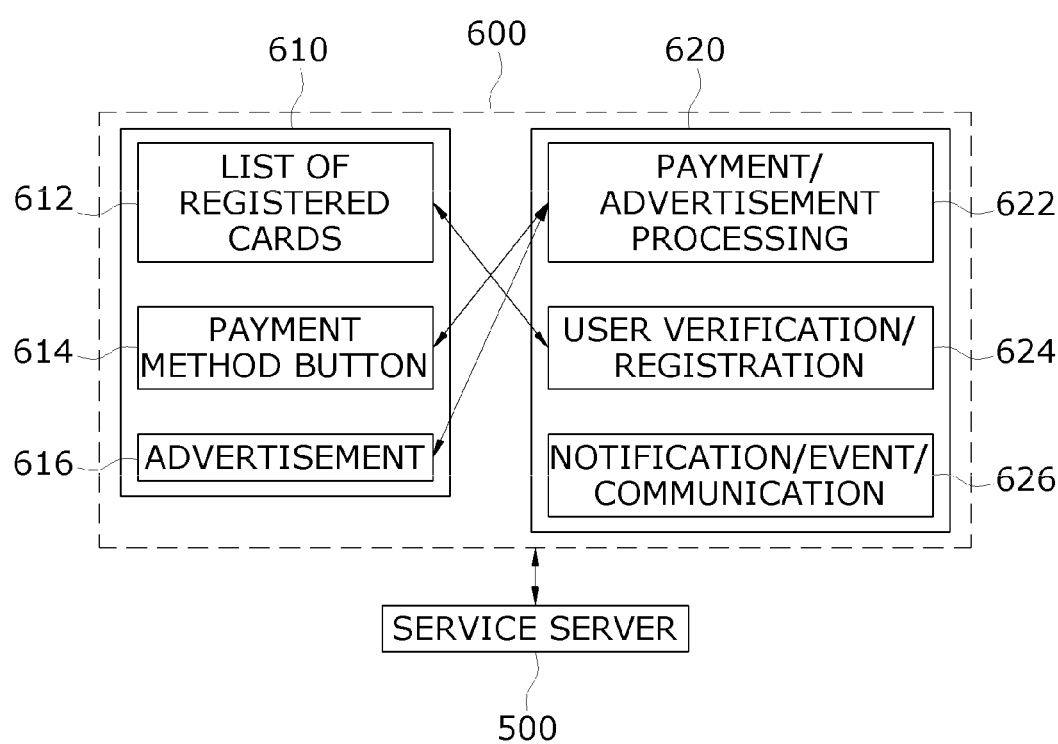
FIG. 6 is a structure diagram of a mobile terminal according to still another embodiment of the present invention.

FIG. 6 is a structure diagram of a mobile terminal 600 used for mobile payment according to still another embodiment of the present invention.

The mobile terminal 600 includes a user interface (UI) provider 610 and a function provider 620.

The UI provider 610 provides a list 612 of registered credit cards or the like for payment, a button for selecting a payment method, such as barcode, a near-field communication (NFC) method, and quick response (QR) code, and an area 616 for displaying an advertisement.

The function provider 620 is composed of modules for a function 622 of providing payment processing or advertisement processing, a function 624 for user verification and registration of a registered credit card or the like, and a function 626 for other notifications, events, and communication.

Since a payment module of a service operator may be installed in the function provider 620 in the form of an app-in-app, it is possible to install the payment module of the service operator regardless of a type of the mobile terminal of the user or a type of application and execute payment at an online/offline merchant.

When a payment is made using the user's mobile terminal 600, the payment is made through communication with the service server 500 using the payment module installed in the form of an app-in-app, and thus the payment information can be received from the service server 500 and be stored and managed regardless of the merchant at which the payment is made.

A plurality of applications for payment including the payment module provided by the service operator may be installed in the mobile terminal 600 of the user, and when the mobile terminal 600 receives a payment request from the service server 500 through a push command, the mobile terminal 600 executes a corresponding application.

After the application is executed, the mobile terminal 600 searches for benefit means, such as points and coupons, as well as a payment means, determines whether to use such means, and transmits a payment request to the service server 500. When the mobile terminal 600 transmits the payment request, the mobile terminal 600 may send membership information for self-verification or pieces of information for payment application authentication in addition to transaction information, such as an amount to be paid, a purchased item, and the like.

Birth date information or a phone number of the mobile terminal 600 may be used as the membership information for self-verification and biometric information, such as fingerprints, iris, signature information, and the like, may also be used.

Figure 7:
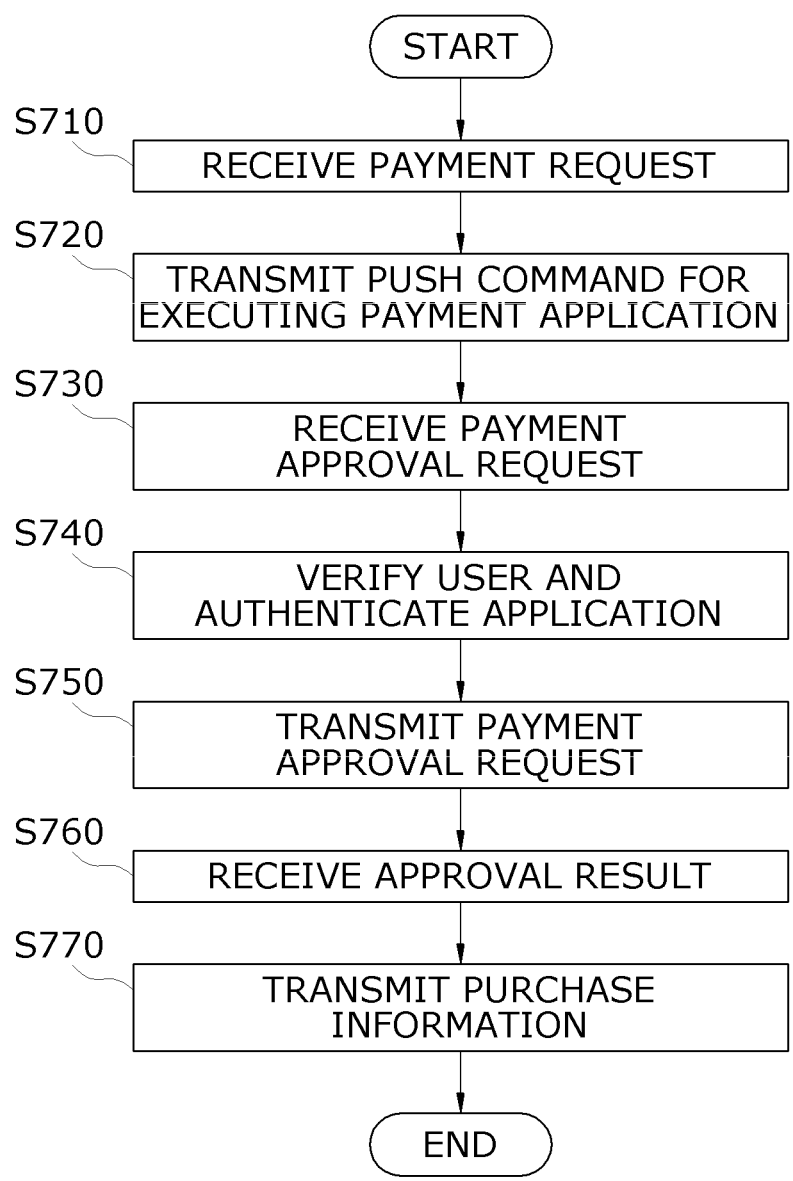
FIG. 7 is a flowchart illustrating a mobile payment method according to yet another embodiment of the present invention.

An application serial number pre-issued by the service server 500 or a unique user identifier (UUID) issued at the time of installation of a payment application may be used as the information for payment application authentication. FIG. 7 is a flowchart illustrating a mobile payment method according to still another embodiment of the present invention.

When purchase information including a purchased item and a purchase amount is input to a merchant and a payment request is transmitted to a service server 500, the service server 500 that receives the payment request (S710) transmits a push command for user verification to a mobile terminal 600 of a user (S720).

In offline payment, data exchange between the mobile terminal 600 and a merchant terminal may be performed by means of an NFC method, QR code, barcode, a payment information relay card, and the like.

When the purchase information is input to the member shot terminal, information for user verification is also input. In this case, the user's phone number or the like may be directly input to the merchant terminal or data exchange with the mobile terminal 600 using an NFC method, QR code, or the like may be available.

When the mobile terminal 600 that has received the push command executes an application and sends a payment approval request back to the service server 500, the service server 500 receives the payment approval request (S730).

The service server 500 performs self-verification of the user using the membership information received together with the payment approval request, performs application authentication by determining, based on payment application information, whether or not the payment application is copied or forged (S740), and, when the self-verification of the user and the application authentication are successfully performed, transmits a payment request to a financial server (440) to execute payment.

The merchant terminal transmits transaction related information along with information for authentication when sending the payment request to the service server 500.

The transaction related information may include a purchased item, a total purchase amount, a purchase amount of each item, a payment means, and the like. When a credit card is used as a payment means, the transaction related information may further include whether an installment payment is made, the number of installment months, and whether a credit card company provides an interest-free installment payment.

The service server 500 may store and manage the transaction information together with the membership information of each user. Since the transaction proceeds by transmitting all the purchase information of the user who uses the payment application provided by the service operator or the affiliated application using the payment module to the financial server via the service server 500, the service server 500 may store the purchase information and provide the purchase information to the user or use the purchase information later as marketing data.

A conventional merchant terminal recognizes only the user purchase information of a corresponding merchant, and a financial server is limited to figuring out user's purchase information since only a purchase amount of the purchase information of a user using the payment means of the financial server can be known.

However, since the service server 500 according to the present invention is able to store purchase information of all users who use the payment application or the payment module regardless of the financial institution or the merchant, it is possible to effectively manage and use collected purchase information. That is, it is possible to establish a shared marketing platform.

When a payment approval result is received from the financial server (S760), the approval result is transmitted to the merchant terminal or the mobile terminal 600 of the user to allow the payment to be completed, and the service server 500 transmits the user's purchase information received from the merchant terminal to the payment application installed in the mobile terminal 600 of the user so that both the service server 500 and the mobile terminal 600 of the user can store and use the transaction information associated with the payment.

The transaction information managed by the service server of the payment service operator is commonly available for application and utilization by the affiliated applications. There is an advantage of providing convenience in using the application through a joint utilization of subscriber information when the application is authenticated, joint application of a registered financial institution without further registration, and setting of a primary payment application.

As described above, although the construction of the present invention has been described in detail with reference to the attached drawings and the preferred embodiments, those embodiments are only exemplary, and those skilled in the art will appreciate that various modifications and changes are possible without departing from the technical spirit and scope of the present invention. Therefore, the protection scope of the present invention should be defined by the description of the accompanying claims.

The invention claimed is:

1. A mobile payment method which uses a service server for mobile payment, the mobile payment method comprising:
   receiving a payment request from a merchant terminal;
   determining whether a merchant, corresponding to the merchant terminal which has transmitted the payment request, has an affiliated application;
   automatically determining without an intervention of a user, based on preset priorities and further based on the determining of whether the merchant has the affiliated application, an application having a top priority among a plurality of payment applications; and
   transmitting, to a mobile terminal of the user, a push command for executing the application automatically determined to have the top priority.

2. The mobile payment method of claim 1, wherein the automatically determining of the application having the top priority comprises, when the merchant has the affiliated application and the mobile terminal has the affiliated application of the merchant including a payment means, automatically determining that the affiliated application of the merchant has the top priority.

3. The mobile payment method of claim 1, wherein the automatically determining of the application having the top priority comprises, in a case in which the merchant does not have the affiliated application,
   when an application that is set by the user as a primary payment application is present among the plurality of payment applications installed in the mobile terminal, automatically determining that the primary payment application has the top priority,
   when there is no application that is set as the primary payment application and a basic payment application including a payment means independent of the affiliated application is installed, automatically determining that the basic payment application has the top priority, and when the basic payment application is not installed but another affiliated application is installed, automatically determining that the another affiliated application including last-installed payment means has the top priority.

4. The mobile payment method of claim 1, wherein the receiving of the payment request comprises receiving the payment request from the merchant terminal with identification information for identifying the merchant.

5. The mobile payment method of claim 1, wherein the transmitting of the push command to the mobile terminal of the user comprises transmitting a payment amount, to which a benefit available in the merchant is applied, together with the push command through the mobile terminal of the user.

6. The mobile payment method of claim 5, wherein, when there are a plurality of available benefits, a benefit with a highest discount rate or a highest amount of points to be saved or a combination of benefits is applied to the payment amount.

7. The mobile payment method according to claim 1, wherein the service server is configured to store and manage a list of applications installed in the mobile terminal of the user.

8. The mobile payment method according to claim 1, wherein, when the application having the top priority is not installed in the mobile terminal of the user, transmitting, by the service server, a push command or an installation link for installing the application having the top priority.

* * * * *